United States Patent [19]

Blackwell et al.

[11] Patent Number: 5,602,933
[45] Date of Patent: Feb. 11, 1997

[54] METHOD AND APPARATUS FOR VERIFICATION OF REMOTELY ACCESSED DATA

[75] Inventors: Richard A. Blackwell; William Vestal, both of Atlanta, Ga.

[73] Assignee: Scientific-Atlanta, Inc., Norcross, Ga.

[21] Appl. No.: 404,636

[22] Filed: Mar. 15, 1995

[51] Int. Cl.[6] .................................................. G06K 9/00
[52] U.S. Cl. ........................ 382/116; 382/118; 382/119; 348/143; 348/161; 902/4; 902/5
[58] Field of Search ..................... 358/434, 435, 358/436, 438, 439, 450, 462, 468, 400; 382/115, 118, 119, 116; 902/4, 5; 348/143, 161

[56] References Cited

U.S. PATENT DOCUMENTS

| | | |
|---|---|---|
| 2,912,066 | 11/1959 | Ellithorpe . |
| 3,237,881 | 3/1966 | Grosswiller et al. . |
| 3,294,342 | 12/1966 | McClure et al. . |
| 3,578,905 | 5/1971 | Anders et al. ............. 348/161 |
| 3,580,993 | 5/1971 | Sandorf et al. . |
| 3,610,544 | 10/1971 | Schwarz et al. . |
| 3,876,864 | 4/1975 | Clark et al. . |
| 3,881,573 | 5/1975 | Cotter et al. . |
| 3,949,364 | 4/1976 | Clark et al. . |
| 4,821,118 | 4/1989 | Lafreniere ................. 382/116 |
| 4,932,047 | 6/1990 | Emmons et al. . |
| 5,077,607 | 12/1991 | Johnson et al. . |
| 5,142,562 | 8/1992 | Guichard et al. . |
| 5,170,427 | 12/1992 | Guichard et al. . |
| 5,191,601 | 3/1993 | Ida et al. . |
| 5,194,955 | 3/1993 | Yoneta et al. . |
| 5,225,978 | 6/1993 | Petersen et al. . |
| 5,237,157 | 8/1993 | Kaplan . |
| 5,432,618 | 7/1995 | Monnot et al. ............ 358/435 |
| 5,432,864 | 7/1995 | Lu et al. ..................... 382/118 |

*Primary Examiner*—Scott A. Rogers
*Attorney, Agent, or Firm*—Banner & Witcoff, Ltd.

[57] ABSTRACT

A verification method for use in a verification system comprises a verification terminal operated by a verification authority, a remote terminal remote from the verification terminal, and a communication link coupling the verification terminal to the remote terminal. The method includes the steps of generating a document data file from an identity document provided at the remote terminal, and then transmitting the document data file from the remote terminal to the verification terminal. The method further includes generating a verification data file that verifies an attribute of the document at the verification terminal. The verification data file preferably comprises a digitized signature of the verification authority operating the verification terminal. The verification data file is transmitted to the remote terminal. Finally, the document data file and the verification data file are merged to produce a verification record. The verification record may be time stamped and stored and/or printed by a printer. In an alternative embodiment, the verification record may be assembled and stored at the verification terminal. The verification method is especially useful for the remote verification of identity documents required at a point of sale of a product or service, for example, banking services.

37 Claims, 11 Drawing Sheets

CONNECTING TO BANKER...

| ACCOUNT OPENING I.D. VERIFICATION | | | |
|---|---|---|---|
| THIS FORM MUST BE COMPLETED FOR EACH SIGNATORY TO AN ACCOUNT | | | |
| ACCOUNT NAME | | ACCOUNT NUMBER | |
| SIGNATORY NAME | | DATE OF OPENING 30-JAN-95 | |
| SIGHTED DOCUMENT DETAILS | (1) | (2) | (3) |
| TYPE OF DOCUMENT | | | |
| PERSON TO WHOM IT RELATES | | | |
| AGE (IF SHOWN) | | | |
| PLACE OF RESIDENCE (IF SHOWN) | | | |
| DATE OF ISSUE | | | |
| PLACE OF ISSUE | | | |
| EXPIRY DATE | | | |
| DOCUMENT NUMBER | | | |
| POINTS | (4) | (5) | (6) |
| SIGHTED DOCUMENT DETAILS | | | |
| TYPE OF DOCUMENT | | | |
| PERSON TO WHOM IT RELATES | | | |
| AGE (IF SHOWN) | | | |
| PLACE OF RESIDENCE (IF SHOWN) | | | |
| DATE OF ISSUE | | | |
| PLACE OF ISSUE | | | |
| EXPIRY DATE | | | |
| DOCUMENT NUMBER | | | |
| POINTS | | | |

901

BANKER NAME — 902

903

ACCOUNT OPENING I.D. VERIFICATION
THIS FORM MUST BE COMPLETED FOR EACH SIGNATORY TO AN ACCOUNT

| ACCOUNT NAME | ACCOUNT NUMBER | |
|---|---|---|
| SIGNATORY NAME | DATE OF OPENING | 9-MAR-95 |

SIGHTED DOCUMENT DETAILS      (1)           (2)           (3)

| | | | |
|---|---|---|---|
| TYPE OF DOCUMENT | | | |
| PERSON TO WHOM IT RELATES | | | |
| AGE (IF SHOWN) | | | |
| PLACE OF RESIDENCE (IF SHOWN) | | | |
| DATE OF ISSUE | | | |
| PLACE OF ISSUE | | | |
| EXPIRY DATE | | | |
| DOCUMENT NUMBER | | | |
| | POINTS | POINTS | POINTS |

SIGHTED DOCUMENT DETAILS      (4)           (5)           (6)

| | | | |
|---|---|---|---|
| TYPE OF DOCUMENT | | | |
| PERSON TO WHOM IT RELATES | | | |
| AGE (IF SHOWN) | | | |
| PLACE OF RESIDENCE (IF SHOWN) | | | |
| DATE OF ISSUE | | | |
| PLACE OF ISSUE | | | |
| EXPIRY DATE | | | |
| DOCUMENT NUMBER | | | |
| | POINTS | POINTS | POINTS |

A MINIMUM OF 100 POINTS MUST BE SCORED.              TOTAL POINTS
OR AN IDENTIFICATION REFERENCE HAS BEEN              YES
OBTAINED
OR SIGNATORY ALREADY IDENTIFIED IN OTHER BANK  YES
ACCOUNT

| ACCOUNT NAME | ACCOUNT NO. |
|---|---|

RESULT OF CHECK

A. SIGNATORY VERIFICATION SATISFIED?         YES____  NO____
   IF NO, CTRA MUST BE ADVISED IN WRITING BY CLOSE OF NEXT WORKING DAY.

B. I.D. VERIFICATION ACHIEVED?                              YES____

C. NEED TO FILE SUSPECT TRANSACTION REPORT       YES____  NO____

SIGNATURE OF CHECKING OFFICER                          DATE

*FIG. 10*

METHOD AND APPARATUS FOR VERIFICATION OF REMOTELY ACCESSED DATA

FIELD OF THE INVENTION

The present invention relates to a verification system and method for verifying the authenticity of credentials or other documents presented at a remote location and/or the identity of individuals presenting such credentials or other documents and for generating a record of the verification. More specifically, the present invention relates to a verification system and method for verifying the identity of a customer who presents an identification document at a remote terminal and for generating a concise verification record including a reproduction of the identification document and the identity of the individual or authority that verified the customer's identity.

BACKGROUND OF THE INVENTION

Advances in computer and communications-related technology have enabled businesses to offer a wide variety of goods and services to their customers at times and at places convenient to the customers. Typically, a plurality of remote terminals are provided in locations easily accessible to the customers. The remote terminals are linked by a communications network to a single central station or a plurality of centralized stations which are operated either by service personnel or by computer. Communications between the remote terminal and the central station execute specific transactions selected by the user via the remote terminal. However, before many transactions can proceed, it is necessary to verify the identity, credentials, documentation, and/or other information associated with, or provided by, the customer.

One common example of network described above is an automated teller machine (ATM) network. ATMs enable bank customers to perform a limited number of banking transactions at hours and at locations convenient to the bank customer. Before any ATM transaction is allowed to proceed, however, the bank customer is required to enter a secret personal identification number (PIN) using a keypad at the ATM. The ATM compares the entered PIN with a stored PIN to verify that the party requesting the transaction through the ATM is indeed the bank customer. One disadvantage of PINs is that they do not positively identify the party requesting the transaction. As a result, the types of transactions available from an ATM is restricted to, e.g., deposits to existing accounts, withdrawals from existing accounts, transfers between existing accounts, and the balance of existing accounts. In addition, the amounts involved in certain transactions, such as withdrawals, is limited.

Other transactions, such as loan applications, the opening of credit lines, the purchase of certificates of deposit or other securities, and the opening and closing of accounts, for example, cannot be performed at ATMs because the risk of loss from a security breach is too great or because of regulations imposed by government authorities. In order to complete these transactions, personal interaction between the bank customer and a bank employee is required. Currently, this requires that the bank customer visit the bank's branch office during standard bank hours. The bank is thus faced with the dilemma of either inconveniencing its customers by restricting certain transactions to standard banking hours or absorbing the increased costs of offering these transactions at its various branch offices during expanded hours.

U.S. Pat. No. 4,845,636 to Walker describes a remote transaction system that includes a plurality of remote transaction booths coupled to an operations center by audio and video communications lines. The remote transaction system permits an operator at the operations center to personally verify the identity and credit of a customer at a remote transaction booth. Each remote transaction booth includes a communication module having a video phone, a dispenser module for dispensing items such as car keys, a verification module, and a recorder for recording the audio and video portions of the transaction. The verification module has a camera for imaging cards or documents placed on a transparent holder plate by the customer in the booth. The image of the card or document is transmitted from the remote transaction booth to the operations center. Upon verifying the identity of the remote customer and securing credit or payment, the operator at the operations center activates the dispenser module to provide access to the items contained therein to the customer in the booth.

The remote transaction system described by Walker has numerous drawbacks and deficiencies. For example, Walker does not provide any record of the identity of the operator that verified the identity of the customer in the booth. Moreover, Walker does not provide the customer with any record of the verification. Furthermore, while the video and audio of the entire transaction can be accessed later, the operator has no way of accessing the verification information without reviewing the video and audio record of the entire transaction. Accordingly, there exists a need in the art for a verification system and method that provides a verification record in a simple and concise form.

SUMMARY OF THE INVENTION

The present invention overcomes the deficiencies in the prior art described above and others by providing a verification method for use in a verification system comprising a verification terminal operated by a verification authority, a remote terminal remote from the verification terminal, and a communication link coupling the verification terminal to the remote terminal. The method includes the steps of generating a document data file from a document provided at the remote terminal, and then transmitting the document data file from the remote terminal to the verification terminal. The method further includes generating a verification data file that verifies an attribute of the document at the verification terminal. The verification data file is transmitted to the remote terminal. Finally, the document data file and the verification data file are merged to produce a verification record.

The verification record may be time stamped and/or printed by a printer. In one preferred embodiment of the invention, the merging of the document data file and the verification data file is performed at the remote terminal. Further, the document used to generate the document data file may identify the user of the remote terminal or, more particularly, may include a photo identification of the user of the remote terminal. The document data file may be generated, for example, by scanning the document or by capturing an image of the document.

In another preferred embodiment of the invention, the remote terminal includes a camera for imaging the user of the remote terminal and a processor for processing the image to generate user image data. The user image data then may be transmitted to the verification terminal where it is displayed. In addition, the document data file can be displayed at the verification terminal. By comparing the displayed user image and the displayed document, the identity of the user can be verified.

The verification data file may include a verification authority identification. For example, the verification data file may include a digitized signature of a verification terminal user. In such a case, the digitized signature can form at least a portion of the verification authority identification.

The present invention is further directed to a method of operating a remote terminal in a verification system including a verification terminal operated by a verification authority, the remote terminal, and a communication link coupling the verification terminal to the remote terminal. The method includes the steps of generating a document data file from a document provided by a user of the remote terminal and transmitting the document data file from the remote terminal to the verification terminal via the communication link. The remote terminal is further operated to receive a verification data file from the verification terminal. The received verification data file verifies an attribute of the document. The verification data file and the document data file are merged to form a verification record.

The remote terminal may be operated to time stamp or print the verification record. In addition, the step of generating the document data file may be accomplished, for example, by scanning the document or by capturing an image of the document. The document may be an identification of the user of the remote terminal, such as a photo identification of the user. Further, the remote terminal may have a camera for imaging the user and a processor for processing said image to generate user image data which may then be transmitted to the verification terminal.

The received verification data file may comprise a verification authority identification or, more particularly, a digitized signature of a verification terminal user.

The present invention additionally relates to a method of operating a verification terminal in a verification system including, in addition to the verification terminal, a remote terminal remote from the verification terminal and a communication link coupling the verification terminal to the remote terminal. The method includes the steps of receiving a document data file representing an image of a document from the remote terminal, generating a verification data file that verifies an attribute of the document, and transmitting the verification data file to the remote terminal over the communication link.

The verification terminal may further merge the document data file and the verification data file to generate a verification record and then time-stamp the verification record. In addition, the verification data file may include a verification authority identification such as, for example, a digitized signature of a user of the verification terminal. In one preferred embodiment, the document data file comprises pixel data representing a photo identification of a user of said remote terminal. The verification terminal may receive user image data representing an image of the user at the remote terminal and display an image generated from the user image data. An image of the document may also be displayed. Using the displayed images, the identity of the user of the remote terminal can be verified.

In a further aspect of the present invention, a verification system is provided that includes a verification terminal operated by a verification authority, a remote terminal, and a communication link coupling the verification terminal to the remote terminal. The remote terminal includes an imager for imaging a document to generate a document data file and a transmitter for transmitting the document data file to the verification terminal via the communication link. The verification terminal includes a receiver for receiving the document data file, means for generating a verification data file that verifies an attribute of the document, and a transmitter for transmitting the verification data file to the remote terminal via the communication link. The remote terminal additionally includes a receiver for receiving the verification data file and means for merging the document data file and the verification data file to generate a verification record.

The verification data file may have a verification authority identification. For example, the means for generating a verification data file may include a digitizer for digitizing a signature of a user of the verification terminal such that the digitized signature may form at least part of the verification authority identification. In one preferred embodiment, the remote terminal includes a printer for printing the verification record. In another preferred embodiment, the imager may include a scanner for scanning the document.

The present invention is further directed to a remote terminal for use in a remote verification system. The remote terminal includes an imager for imaging a document to generate a document data file, a transmitter for transmitting the document data file to a verification terminal via a communication link, a receiver for receiving from the verification terminal a verification data file that verifies an attribute of the document, and means for merging the document data file and the verification data file to generate a verification record.

As above, the remote terminal may include a printer for printing the verification record, and the imager may be a scanner for scanning the document. The document used to generate the document data file may be, for example, an identification of a user of the remote terminal. Moreover, the verification data file may include a verification authority identification, such as a digitized signature of a user of the verification terminal.

The present invention further includes a verification terminal for use in a remote verification system. The verification terminal includes a receiver for receiving a document data file from a remote terminal over a communication link, the document data file representing an image of a document. In addition, the verification terminal includes means for generating a verification data file at the verification terminal, where the verification data file verifies an attribute of the document and has a verification authority identification, and a transmitter for transmitting the verification data file to the remote terminal via the communication link. The means for generating a verification data file may include a digitizer for digitizing a signature of a user of the verification terminal.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIGS. 7–9 comprise exemplary on-screen-displays provided to a user of the remote terminal of FIG. 2 during sessions described by the flowcharts of FIGS. 4–6B.

FIG. 10 provides an exemplary form utilized to advantage by both a verification authority and a user to record identity documents that have been presented and verified, which form is related to the partial form shown in the on-screen-display image of FIG. 9.

DETAILED DESCRIPTION OF THE PREFERRED EMBODIMENTS

Figure 1:
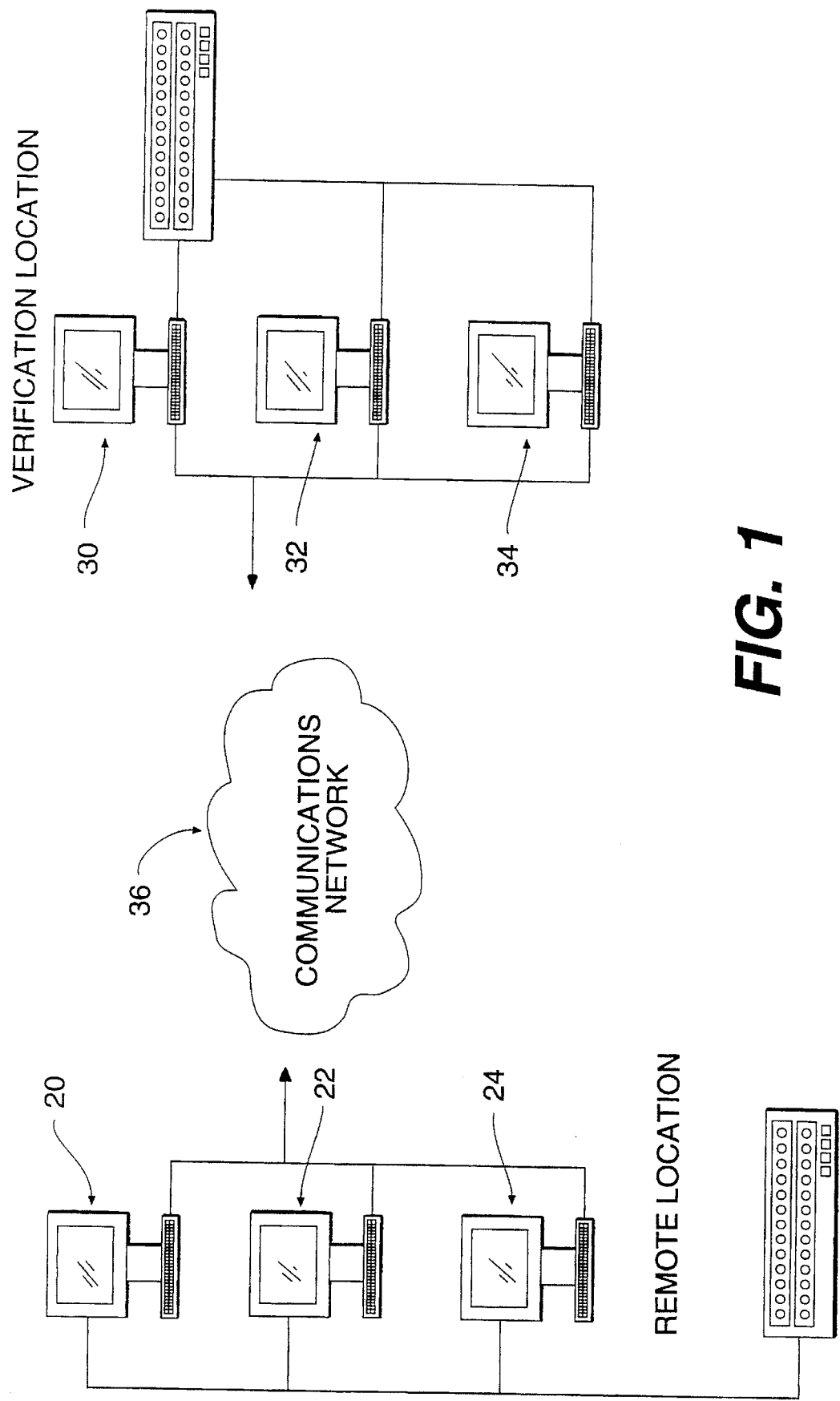
FIG. 1 is a block diagram of a remote verification system in accordance with the present invention in which a plurality of remote terminals are connected via a communications network to a plurality of verification terminals at a central location.

Referring to FIG. 1, there is shown a remote verification system in accordance with the present invention. The invention is described here in the context of a banking environment. However, the invention is not so limited, and may apply to any environment involving a transaction conducted between a central location and a remote user location, where it is desired to verify the identity and credentials of the individual at the remote location and to provide a verification record.

In accordance with the invention, a remote verification system generally comprises a remote terminal operatively connected to a central facility by external communication lines. In FIG. 1, a plurality of remote terminals 20, 22 and 24 are remotely provided, for example, at a bank branch location, and are connected to a plurality of verification terminals 30, 32 and 34 positioned at the central verification facility, for example, at a head office of the bank, via a communications network 36. In the preferred embodiment, network 36 is a digital telephone transmission network. However, any high speed bi-directional communication path, including, for example, coaxial cable, fiber optic lines, satellite transmission and terrestrial microwave may be used.

As shown in FIG. 1, the remote terminals are interconnected for communication with each other and with a network server (not shown) via a local area network. The network provides a central location, e.g., a public network directory, within the remote site for locally retaining certain information, such as date sensitive information and system upgrades, which are downloaded, via the communications network, from the central facility.

Still referring to FIG. 1, the central verification facility comprises a plurality of verification terminals 30, 32 and 34, which similar to the remote terminals, are part of a local area network (LAN). The LAN services system upgrades of the verification terminals, controls access to any verification terminal and also coordinates responses by the verification terminals to incoming calls, e.g., from the remote terminals, by bypassing any device that is offline.

In operation, any one of the verification terminals can be connected with any or all of the remote terminals. Once the connection is established, a verification authority, such as a banker, at the verification terminal, through a video conferencing capability, can visually observe and also communicate orally with an individual conducting a transaction at the remote terminal.

As will be explained, an individual at a remote terminal initiates a call to the central facility by activating a switch at the remote location. This causes the microprocessor included at the remote terminal to dial a preprogrammed telephone number of the central facility. However, once the call is received at the central facility, the verification terminal assumes complete control of the remote terminal, including control of the audio and video equipment at the remote site, thus limiting the required user interaction to starting the call.

Figure 2:
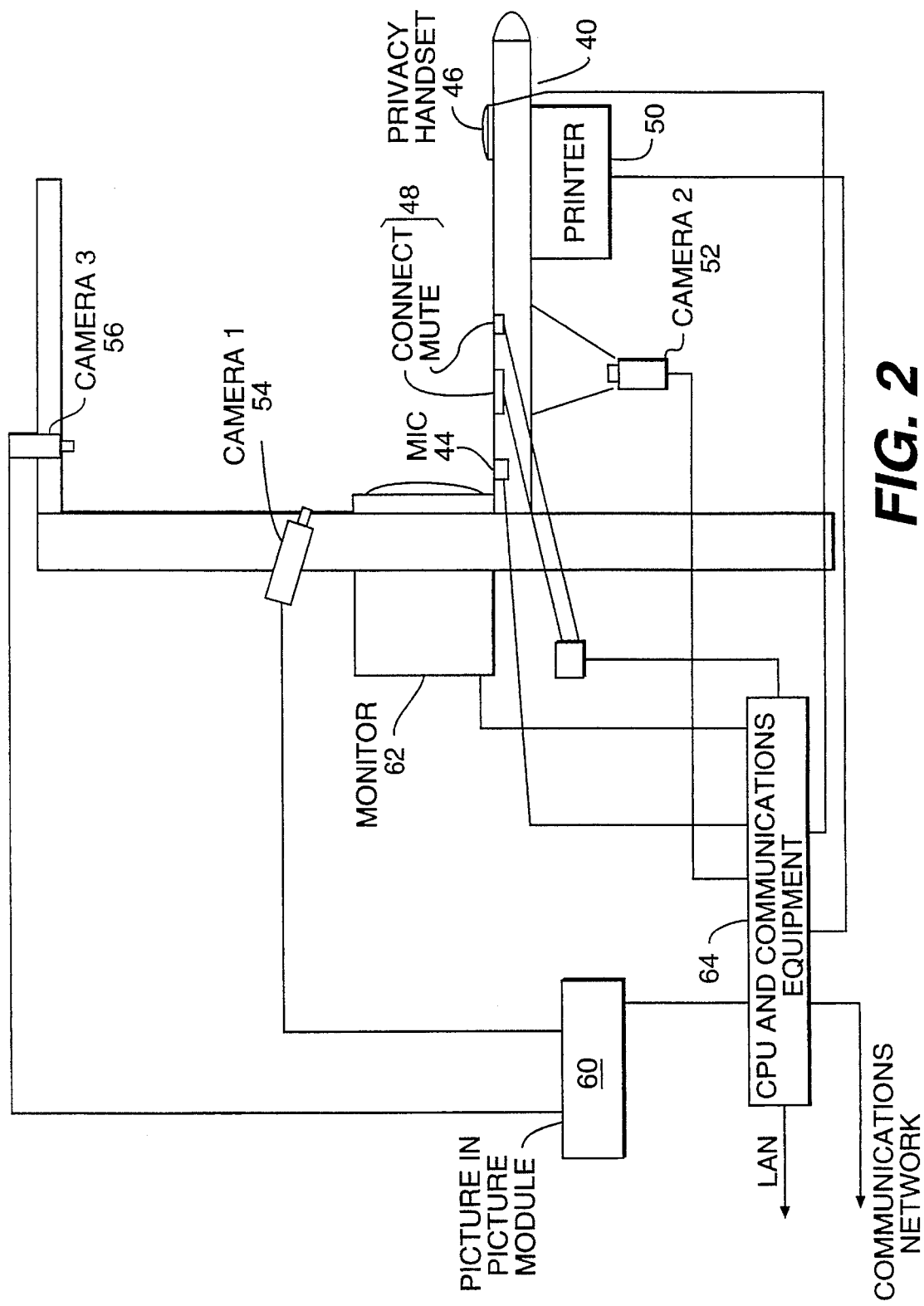
FIG. 2 is a diagrammatic representation of a remote terminal showing its major components.

A remote terminal is shown in FIG. 2 and generally comprises a booth-like housing having an open entrance through which a person may enter to conduct a transaction. Within the housing is a seating area (not shown) and a desk 40 is provided opposite the seating area to face the seating area. Positioned on the desk is a built-in microphone 44 which normally is used for audio communication between an individual at the remote terminal and the verification authority at the verification terminal. A privacy handset 46 also is provided and may be used in place of microphone 44 for providing private audio communication, if desired, between the user at the remote terminal and the verification authority at the verification terminal.

A keypad 48 positioned on the surface of the desk comprises a "Connect" button and a "Mute" button, which can be separately actuated by the remote terminal user. The Connect button, as explained in more detail later, is actuated by remote terminal user to initiate a call to the central facility. The Mute button is operated to disengage microphone 44 for user privacy.

A printer 50 is provided below the desk level, and is controllable from the verification terminal to print document files downloaded from the central facility for dispensing to the user. These printed materials document the transaction and/or may be provided for review and signature by the user.

Positioned adjacent the printer is a document camera 52 for focusing on a document supporting tray (not shown). The document tray is designed to receive a document, such as an identification document of the user, and is composed of a substantially transparent material, e.g., glass or plastic, so that camera 52 can capture an image of a document positioned on the tray. A suitable document camera for use in the present system is a Cannon Model VC-C1 camera.

Other video equipment provided at the remote terminal includes two cameras 54 and 56. The first camera 54 is positioned to capture the image of a person sitting or standing within the remote terminal for transmission to the verification terminal. The second camera 56 is positioned overhead to capture an image of the entire interior of the remote terminal. This image also is transmitted to the verification terminal for security and surveillance purposes. Sharp Model YH-7B60 cameras may suitably be used as cameras 54 and 56.

In the present embodiment, as shown in FIG. 2, the output of camera 54 and camera 56 are supplied to a picture-in-picture module 60 which combines the personal image and the surveillance image. Normally, a reduced image of the interior of the remote terminal appears within a larger image of the remote terminal user. However, module 60 can be suitably controlled to swap the two images. Picture-in-picture module 60 is of the kind well known in the art and may be implemented using a Roctec Model NVP-30 unit.

A video switch (not shown) is controlled by signals from the verification terminal to selectively direct an output image of a document from camera 52 or personal and surveillance images from cameras 54 and 56 for transmission to the verification terminal.

A monitor 62 is provided to display video images received from the verification terminal. These video images may include an image of the verification authority at the verification terminal and may also include textual information, e.g., an image of a document from the verification terminal.

At the heart of the remote terminal is a microprocessor 64. Communications equipment is included with the microprocessor for providing a communications interface between the remote terminal and the digital telephone transmission network and the LAN. This communications equipment is of the kind well known in the art and includes, for example, automatic dialer circuitry for dialing a preprogrammed number stored at the microprocessor for connecting to the central facility. Appropriate circuitry also is included for converting the analog voice and video signals output by the various components of the remote terminal to digital form and for preparing and packetizing the digital information for transmission. Circuitry likewise is provided for receiving a stream of data transmitted from the verification terminal and for reformulating and converting the digitized audio and video signals to analog signals for use at the remote terminal.

In practice, microprocessor 64 may be an IBM 486DX2 processor. Communication equipment in the form of a Zydacron Z200 communications coder/decoder, Zydacron V.35-1 network interface card and Ascend BR14-2P inverse multiplexer also is suitably used.

Microprocessor 64 is coupled to the audio and video components of the customer terminal, including microphone 44, privacy handset 46, cameras 52, 54 and 56 and picture-in-picture module 60 for receiving output signals for transmission to the central facility. Microprocessor 64 also is coupled to printer 50 for controlling the printing of document files transmitted from the verification terminal or generated locally at the remote terminal, e.g., via document camera 52, and to monitor 62 for transmitting video images received from the verification terminal for display. Audio signals from the verification terminal are received at the microprocessor and supplied to speakers (not shown) associated with monitor 62 or, alternatively, to handset 46 for communication to the user as audible sound.

In addition to receiving audio and video signals, microprocessor 64 also receives control command signals from the verification terminal. The microprocessor is responsive to these command signals for controlling the various equipment at the remote terminal, e.g., to operate the video switcher to switch between camera 52 and cameras 54 and 56.

Figure 3:
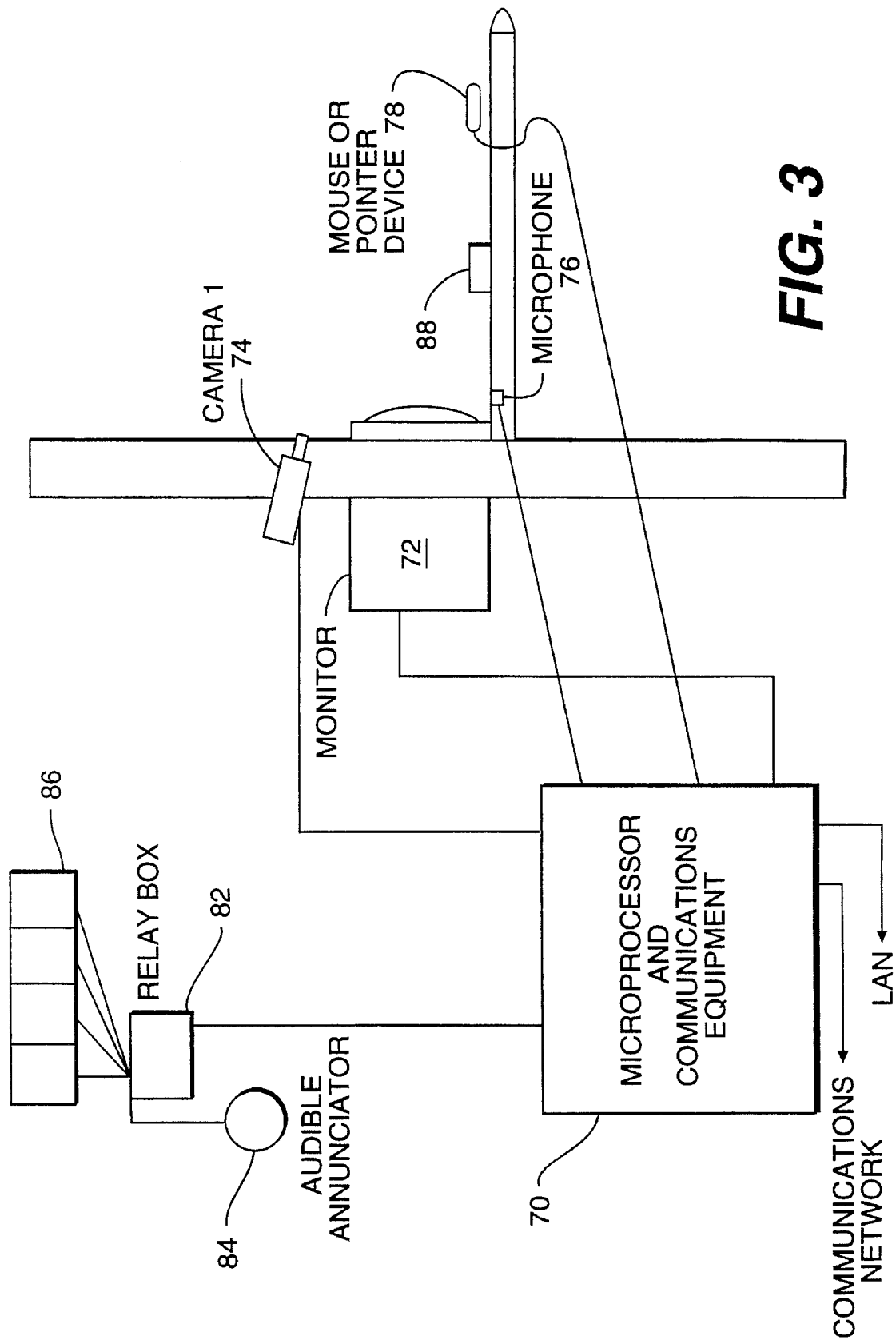
FIG. 3 is a block diagram of a verification terminal with its major components.

FIG. 3 is a block diagram of a verification terminal. As shown in the figure, the verification terminal comprises a microprocessor 70 which includes communications equipment, substantially as described above with respect to the remote terminal, for interfacing with the communications network and LAN. A monitor 72 is coupled to the microprocessor for displaying video images and speakers (not shown) are associated with the monitor for supplying audio communications received from the remote terminal. A camera 74 also is coupled to the microprocessor and is positioned to capture an image of the verification authority sitting or standing at the verification terminal for transmission to the remote terminal. Audio input from the verification terminal to the remote terminal is provided by way of a microphone 76 coupled to microprocessor 70.

The verification authority at the verification terminal conducts a transaction session with a person at a remote terminal through use of a sequence of menu screens which are stored in microprocessor 70 and selectively accessed by the verification authority by operating an input device 78, for display on monitor 72. In the preferred embodiment, input device 78 comprises a mouse or a pointer device. These on-screen displays define soft-function keys that can be activated by the verification authority to control the system operation, e.g., to transmit control command signals or other information to the remote terminal, in accordance with the dialogue taking place between the remote terminal user and the verification authority.

The verification terminal also includes a relay control device 82. Relay 82 is coupled to the microprocessor and is energized upon connection of a call from a remote terminal to one of the plurality of verification terminals. At that point, an audible annunciator 84 is activated to audibly signal that a call is incoming and a status light 86 is turned on at the verification terminal to which the call has been routed. In practice, a hunt group is established so that an incoming call will be routed to the first available verification terminal.

A digitizer 88 also is provided and comprises an electronic pad or tablet for allowing the verification authority to enter a handwritten signature, which is digitized and stored at the microprocessor, as part of the process, explained in more detail below, for verifying the identity of the remote terminal user. The digitizer is suitably implemented using a Handwriter Model CIC for Windows digitizer pad.

Figure 4:
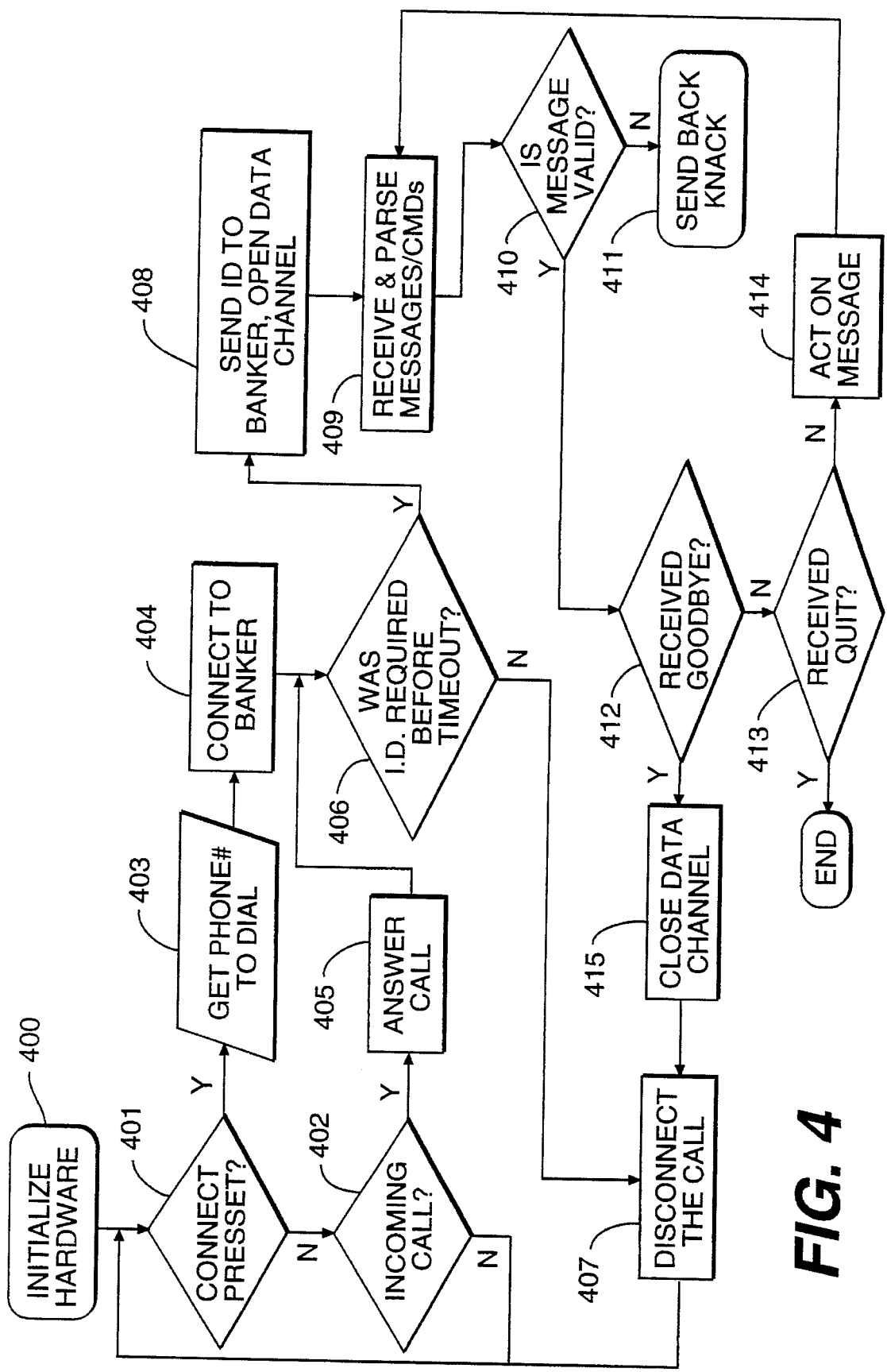
FIG. 4 is a flowchart of an overview of the control software resident in the remote terminal of FIG. 2.

Referring now to FIG. 4, there is shown an overall flow chart useful in describing operations at a remote terminal according to FIG. 2. The remote terminal, for example, a personal banking terminal, sometimes referred to herein as a personal banking chamber or PBC, is typically found in an unoccupied mode of operation, when no user is utilizing the terminal. Once power is turned on to the remote terminal apparatus, the various hardware components of the remote terminal initialize themselves at "initialize hardware" operation block 400. Processor and communications equipment then verify operation of input and output devices coupled to it including, the several video cameras (for overall surveillance, capturing an image of an identity document, and personal communication with a user), the picture-in-picture mode (for combining personal image and overall surveillance image), the microphone, the handset (for privacy), the printer and the like.

Once initialized, the remote terminal enters an attract mode similar to that used in a video game arcade to attract users to use the remote terminal. In a banking application, the remote terminal may, for example, play a bank commercial message describing the terminal and what the user can use the terminal for, the attract mode utilizing both the monitor and associated speaker for playing the predetermined attract message. At least once during this "attract mode" and related message, an instruction screen is displayed advising the user that to initiate a communication, the user must actuate a "connect" button. The attract mode is definable and programmable, of course, by bank personnel. It may be repeatable every ten seconds, thirty seconds or whatever the banker desires. The display may even provide a subordinate screen or partial screen in connection with the instruction screen showing the terminal layout and the exact location of the connect key. In this manner, the user of the remote terminal may be assisted in a user friendly manner to proper use of the remote terminal.

There are two possible events which can take the remote terminal out of the "attract" mode. A first event is the actuation of a connect key by a user represented by decision block 401 of the flow chart of FIG. 4. The other is the possibility that the remote terminal itself receives an incoming call represented by decision block 402. Otherwise, the attract loop continues in which the remote terminal continues to play the user informative message regarding the remote terminal.

Referring to decision block 402 first, the only incoming call the remote terminal, for example, the personal banking terminal, will accept is one from the central or verification terminal or, for example, the video banking terminal or chamber (VBC), in the event, for example, a call-in-progress was suspended or broken, for example, during an unexpected communications break. Then, the user and the verification authority (for example, a banker) at the central verification terminal reestablish communication at an assumed point in the flowchart, in this instance, by the verification authority placing a call to the remote terminal preidentified to it during call-set-up block 403.

Meanwhile, if the "connect" key has been actuated, then, the operation block 403 is entered for obtaining an appropriate telephone number for dialing. While doing so, a display "one moment please . . . " (not shown) may be provided on an on-screen display. To obtain a telephone number, the remote terminal checks itself to determine the present time-of-day. In terminal memory are stored lists of valid telephone numbers for central terminals in various locations around the world. In accordance with the present invention, there may be at least two locations so manned so as to provide two twelve hour shifts or three locations of central terminals so manned as to provide three eight hour shifts of verification authorities. Of course, other shifts may be selected in accordance with the spirit of the present invention including overlapping shifts or shifts which do not provide twenty-four hour access but reasonable access such as 6:00 AM to 2:00 AM. When a terminal notes its time-of-day, the current time-of-day is compared with valid times-of-day identified in memory lists related to particular central terminal locations and associated telephone numbers. There may be one or more default telephone numbers available at any particular time of day.

For example, if the present time-of-day is 10:00 AM, the central location and associated telephone number may be for a central terminal located at least within the same time zone. On the other hand, if the present time-of-day is 10:00 PM, then, the central terminal may be located in a time zone twelve hours removed from the remote terminal.

Assuming that the phone number has now been acquired from memory, the remote terminal attempts to place a call at operation block 404 via an automatic dialer circuit of communications equipment. In advance of the call, the user may be advised audibly or via on-screen-display or combination thereof to wait just a moment, that the user will be soon placed in operative personal contact with a personal banker. A screen is displayed to the user of the remote terminal such as a "Connecting to banker . . . " screen as shown in FIG. 7 and the attract mode is discontinued. The "Connecting to banker . . . " screen is generated locally by on screen character generators of CPU and communications equipment in well known manner. The connection may require a connect interval of up to 50 seconds or more to accomplish a communications link. In accordance with the present invention, preferably a predetermined time-out period may be allowed to expire to assume a call does not go through. In such an event, the automatic dialer will be programmed to dial the next available number in a memory list for the present time of day and to repeat the cycle of telephone numbers until one is reached.

During the "connecting to banker" operation, the terminal collects data, packetizes the data and prepares the data for transmission as soon as connection is established. Such data includes at least the remote terminal identifier data and may further include its telephone number for return communication in the event the communications link is unexpectably broken. The central terminal may store a look-up table in memory for remote terminal data and, alternatively, identify the calling remote terminals' telephone number by table look-up. In this manner and in the event the connection is broken as already suggested may occur above, the central terminal may attempt to reestablish the connection and obtain a new communications link.

Returning now to decision block 402, if the incoming call is received, the "answer call" operation block 405 is entered. With the incoming call, the terminal should expect to receive a call from the already-communicated-with central terminal. Consequently, the answered call will be disconnected if the call is from any other party than the central terminal. In accordance with the present invention, the personal terminal will also receive a central terminal identifier from the calling terminal and require that identifier to match that of the central terminal of the broken call-in-progress to further verify that the incoming call is intended for it and related to the present user of the remote terminal.

Now, regardless of whether this is a new call (from step 404) or a resumed call (from step 405), the remote terminal enters an assumed point in the flow chart, for example, decision block 406 questioning whether an ID had been requested before timeout (or call break). This ID is the PBC identifier, in the banking example, the preferably unique identifier data for the remote terminal or personal banking terminal the user has actuated. First, the various forms of commands, requests and set operations will be discussed before returning to a discussion of the present decision block 406.

Commands transmitted from central terminal to remote terminal are preferably comprised of first, second and third fields or tokens. A first field may be of a type identifying it as a command to distinguish the following data and interpretation thereof by the remote terminal from diagnostic and upgrade messages, information requesting messages and set parameters messages. Diagnostic and upgrade messages will not be further described. Of the command messages, for example, represented by the field CMD, subsequent fields identify the state the remote terminal is to move to and data surrounding that state. Of the request messages, for example, represented by the field REQ, subsequent fields identify the apparatus about which information is requested and data reported about that apparatus. Of the set parameters messages, for example, represented by the field SET, subsequent fields identify the apparatus to be set and data regarding that apparatus to be set.

For example, the command—CMD, Capture_Image, (none)—causes the remote terminal to capture an identity document image, store the image locally and look to the communications link with the central terminal for receipt of a digitized verification signature file and take other actions as will be further described below.

Figure 8:
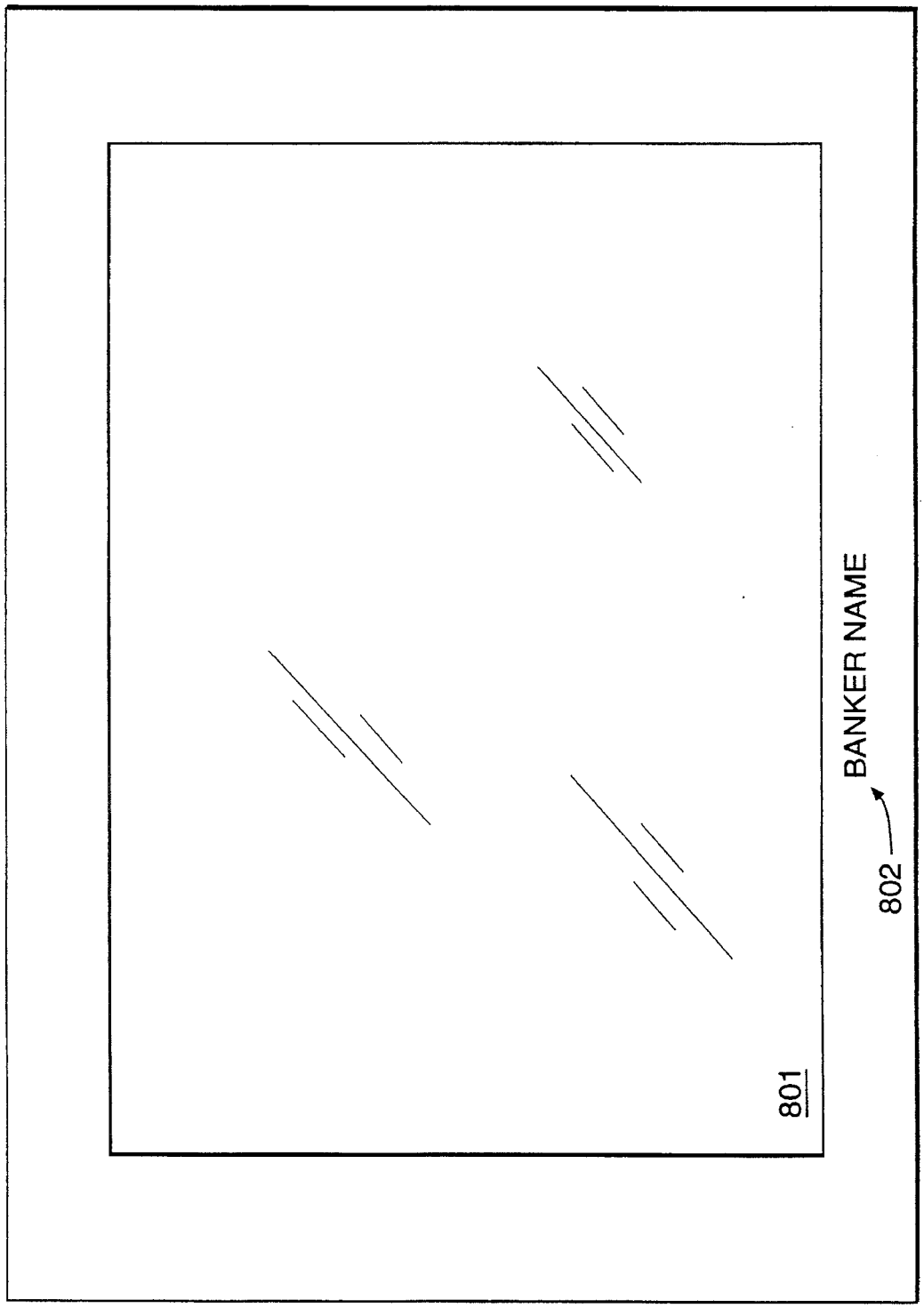

Other commands used during a session include the command—CMD, setscreenstate, fullscreenvideo—for commanding the remote terminal to display the largest possible image of the verification authority. See, for example, FIG. 8, in which the personal display of the banker 801 is shown encompassing practically the whole frame, the frame itself including the banker's personal name 802, for example, Mr. James.

Another related screen command has the data "whiteboard_portrait" in the last field. The command causes the on-screen-display at the remote terminal to comprise the elements of FIG. 9, in which there is a banker picture 901, a banker name 902 and a whiteboard 903. The command indicates that the whiteboard is a portrait mode as shown in FIG. 9. A related command forces the whiteboard into a landscape mode (not shown) where the whiteboard fills the screen under the banker's picture from left border to right border and a blank area appears to the right of the banker picture.

On to the whiteboard, assumed to be blank, an on-screen-display is presented after receipt of the command of any downloaded text file following, for example, the command update remote. For example, referring to FIG. 9, there appears a display of a form entitled "Account Opening I.D. Verification". This form, in accordance with the present invention is utilized by the verification entity to record the verification of identity documents and point values accumulated thereby. A copy of the entire form may be printed to the user as shown in FIG. 10.

An example of a request message is REQ, Phone, (none). The remote terminal on receiving this message returns the remote terminal phone number to the central terminal.

Finally returning to the present decision block 406 of FIG. 4, the remote terminal is expecting to receive from the central terminal a command, REQ, "Id", (none), ordering the remote terminal to return the collected data regarding at least its unique terminal identifier. If the remote terminal does not receive the REQ request within a predetermined period of time, control in passed to "disconnect the call" block 407. Of course, the call is disconnected and control is returned to the loop comprising boxes 402,403 from disconnect block 407.

These commands may be actuated automatically by the central terminal or manually by the verification authority. When done so manually, the verification may be prompted from an on-screen display, from actuation of a multi-function key defined by software or defined by the on-screen display, or may be clicked to from operation of a mouse by the verification authority.

An example of a set parameters message is SET, Videosource, "document." This set parameters message is utilized by the verification entity to actuate the identity document reader camera so that he can view any identity document inserted therein at the location of his central terminal.

Of course, if the "id" of the personal banking terminal is properly requested as expected, then control is passed to operation block 408 for sending the terminal identifier data to the central terminal upon opening a data channel to the banker.

Now the banker and the customer are prepared to either initiate or resume personal dialog. At operation block 409, there is represented the operation of repeatedly receiving messages (SET and REQ, for example) and commands (CMD's) from the central terminal as described to some extent above. Each message/command is parsed into its component parts and validated. If at decision box 410, the message is determined to be invalid (the N path), then a negative acknowledgement is returned to the central terminal at box 411. If the message is valid then, box 412 is entered. Box 412 relates to an expected message of CMD, "screenstate," "goodbye" which would be expected if the banker and the customer were completed their business. Then, the data channel is closed at operation block 415 and the call disconnected at block 407 and so on.

If "goodbye" is not received, then, another possibility is a "Quit" command receipt. If "Quit" is not received either, then, the message is acted on at box 414 and the loop 409–414 is repeated so long as commands are to be executed. Of primary importance to the present invention is the set of commands that permit verification of the identity of the user of the remote terminal by the verification authority, the banker, at the central terminal. Some of these processes will be now described in connection with a discussion of FIGS. 5A–5B.

Figure 5A:
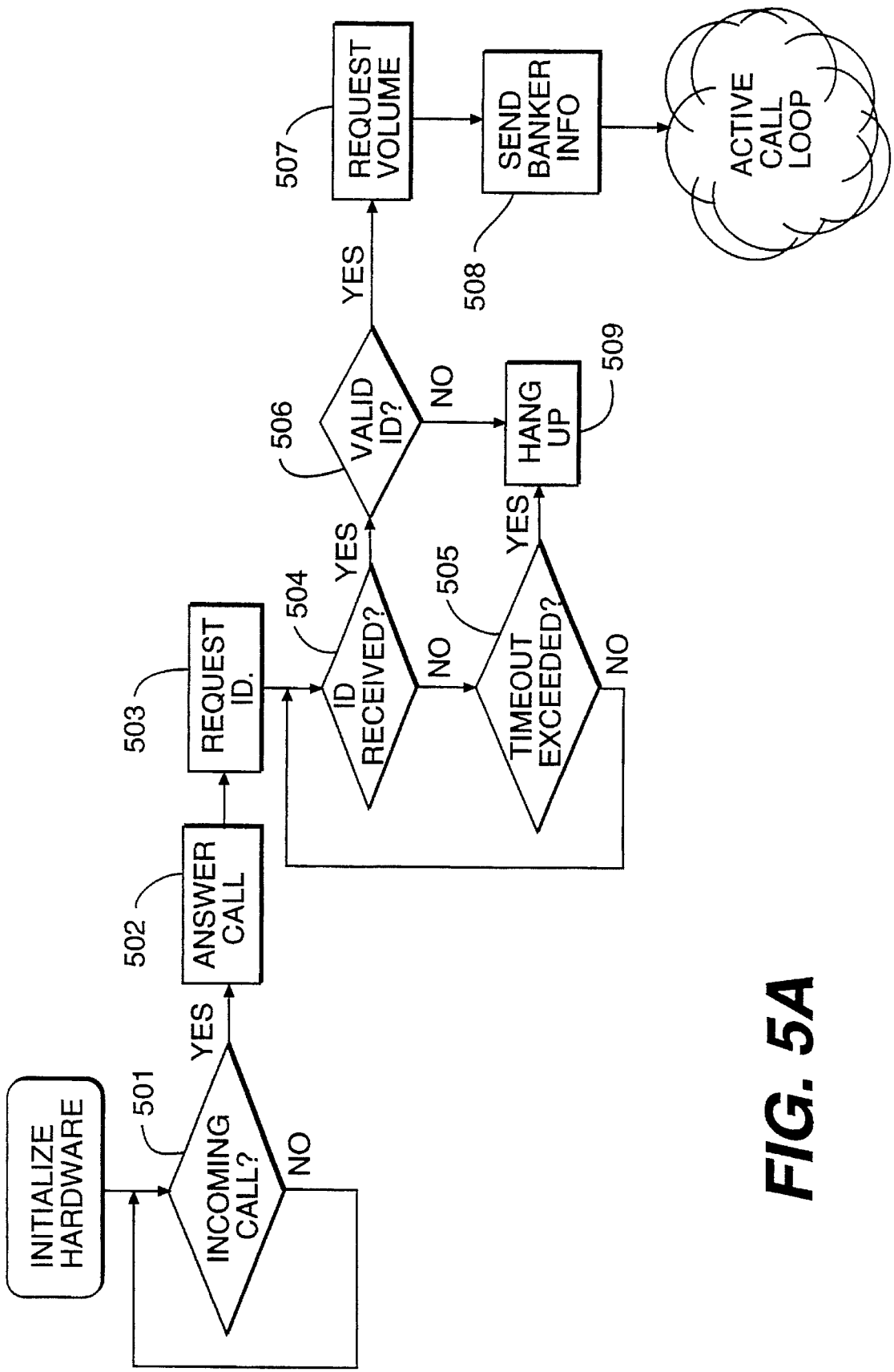
FIGS. 5A and 5B together comprise flowcharts of an overview of the control software resident in the verification terminal of FIG. 3, wherein FIG. 5B identifies a "view" and a "capture" routine obtained through its control.
Figure 5B:
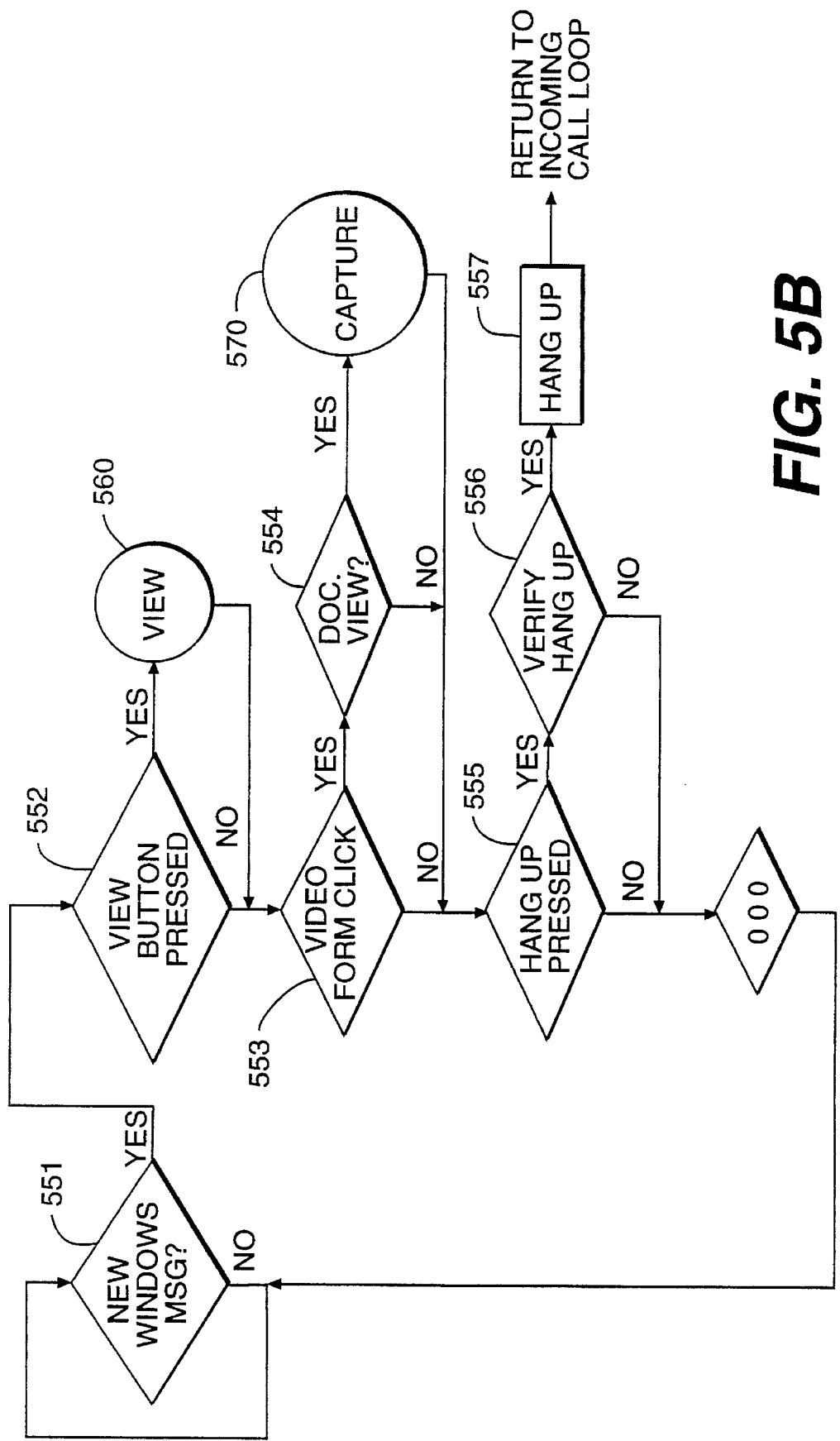

Referring to FIGS. 5A–5B, there is provided an overall flowchart of operations at central verification terminal of FIG. 3. Many of the operations of the central terminal, by way of example, a video banking terminal (VBC) manned by a banker, are analogously similar to those operations at the personal banking terminal or PBC as described in regard to the flowchart of FIG. 4. On the other hand, it should be appreciated that the video banking terminal or central verification terminal is assumed to be in control of the transactions and dialog that occurs with a user of the remote terminal PBC.

Once the video banking terminal hardware is initialized, the camera is checked to be operating and the like, incoming call decision block 501 is repeatedly checked and looped through. If there is an incoming call, operation block 502 is entered and automatic call answering equipment establishes a connection and data channel toward the remote terminal. For example, a hunt group may be established whereby if central terminal 1 at a particular verification location is busy, then terminal 2 answers the call and so on. At operations block 503, the REQ Id message is transmitted to the remote terminal from whichever video banking terminal at a particular location responds to the call. At block 504, the central terminal expects to receive the PBC Id data in response to their requests and, if not, a clock timer decision block 505 is entered. If the predetermined timeout time is exceeded, then the call is hung up at block 509, otherwise, the central terminal continues to await receipt of the remote terminal identifier data at block 504.

If a data message is received, it is checked for validity against a table of valid PBC id's stored in memory of central terminal. Decision box 506 represents this valid id checking process. Of course, if the data received is noise or invalid, the block 509 is entered and the call disconnected.

If the remote terminal id is valid, then, the central terminal automatically requests volume at the PBC via the REQ "volume" message at operations block 507. The central terminal reports the volume level to the banker who, by now, is making himself comfortable in the VBC. Once the verification authority or banker has logged in, or if he has previously logged in, the operations block 508 is entered in which a SET command is issued to the remote terminal SET, Banker, bankername string. Upon receipt, the remote terminal will display the banker's image to appear above the banker's name via an on-screen display generator of the remote terminal as per FIG. 8. Now the control of the software proceeds to the active call loop of FIG. 5B.

Figure 6B:
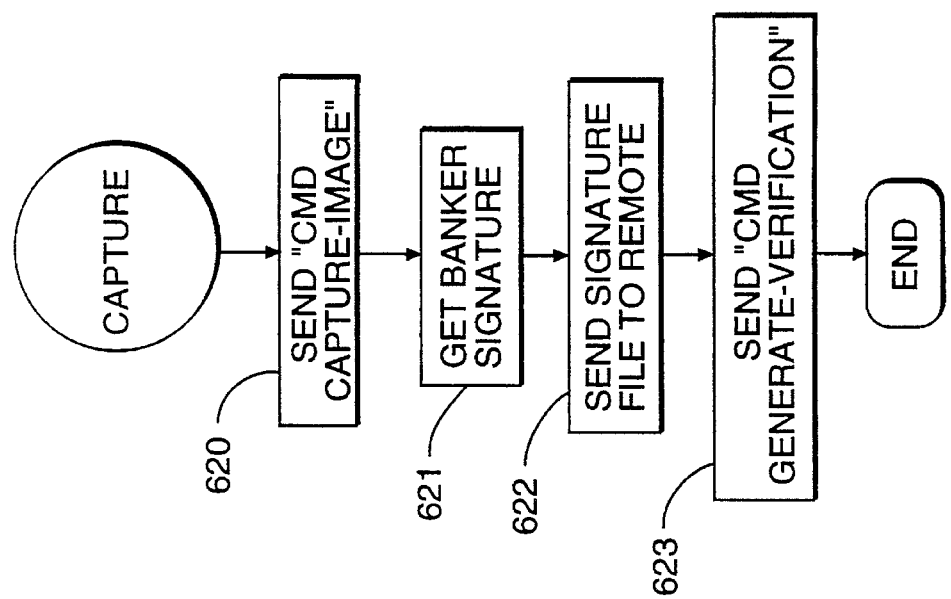
FIG. 6B comprises a flowchart of the "capture" subroutine obtained through the control flowchart of FIG. 5B.
Figure 6A:
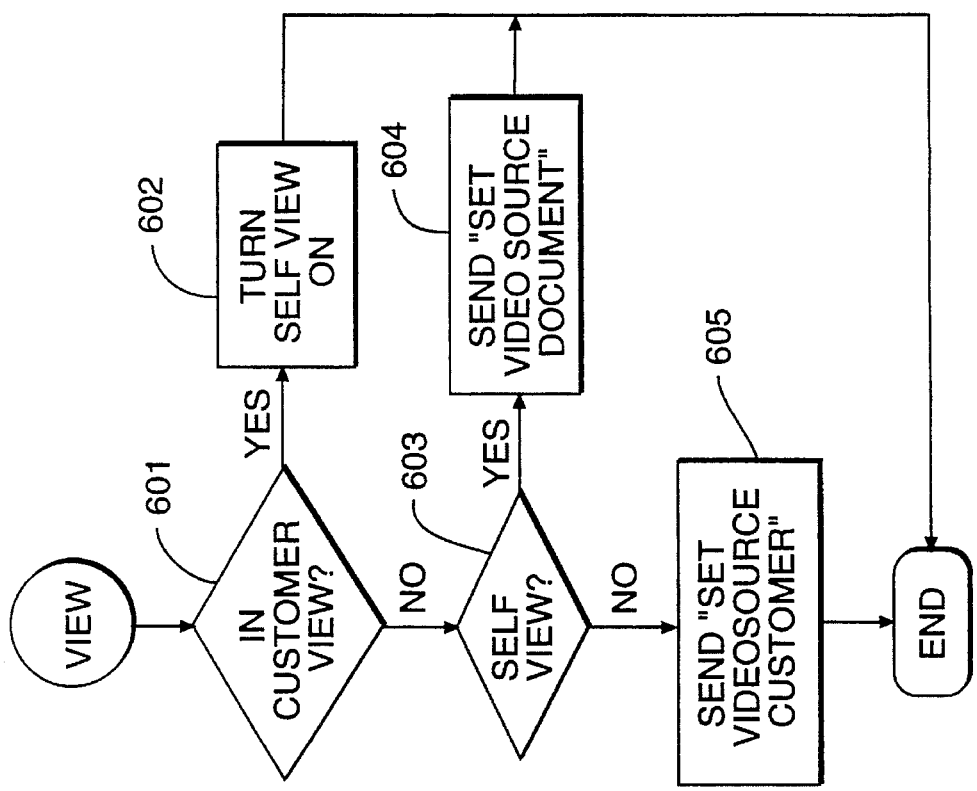
FIG. 6A comprises a flowchart of the "view" subroutine obtained through control of the flowchart of FIG. 5B.

Referring to FIG. 5B, there is shown the active call loop which is the repetitive process at the VBC for accomplishing the customer's business. The verification authority or, in particular, a banker, is aided through the process of assisting the customer by a Microsoft "Windows" software and mouse. New messages appear to the banker at decision block 551 to prompt the banker's actions. If a message appears, then the next decision box entered, box 552, asks if the banker has actuated a "view" button of the central terminal. If so, a view subroutine, described further in connection with FIG. 6A, is entered.

If the "view" button is not actuated, the control passes to decision block "video form click" box 553. This block is questioning whether the banker has clicked to a process of verification of identity of an individual. If so, then, can the banker view the document is asked at box 554. Again, if so, then, the capture subroutine is entered as will be described in regard to box 570 and FIG. 6B.

If the video form is not clicked to, then, control passes to decision box 555, is hang-up key pressed? If yes, the a decision block for verification of hang-up is entered, box 556. If so, then, the disconnect or hang-up block 557 is entered and the process returns to FIG. 5A, box 501.

Now, referring to FIG. 6A, the view subroutine will be described in further detail. The purpose of the view routine is to control what it is the banker sees and permit the banker to self-view if he wishes. In box 601, the banker is asked if the banker is in the customer's view. If so, then the banker can "turn self-view on" at block 602. If the banker is not in the customer's view, then, the decision block "self-view?" 603 is entered. If "self-view" is yes, then at operations block 604 a message is actuated by the central terminal "SET videosource document." This command sets the received video signal to include that of the identity document camera of the remote terminal. If "self-view" is no, then, the banker and customer are still taking and the operation block 605 is entered to send "SET videosource customer." This SET command sets the received video signal the banker sees to include that of the customer communications camera. It can be seen from this discussion that that banker then can compare, via this routine, a photograph of an image on an identity document with the live individual sitting before him and via the surveillance camera, assure that no tricks are being played on him by the customer. To assist in this process the picture-in-picture module inserts the surveillance camera image into the personal user image for display at the VBC.

Now referring to FIG. 6B, the capture routine of the present invention will be described in further detail. It is assumed that an identity document has been placed on a shelf for viewing by the banker and the "document" camera source has been selected per FIG. 6A. Between, the customer and the banker, the banker at some point comes to a conclusion that the identity document is authentic, that the photograph on the document and the image he sees of the customer are images of the same person. At that point, the banker clicks their mouse to capture a digitized image of the identity document. Upon receipt at the remote terminal, the image is digitized and stored to a file, for example, doc.bmp, for identity document bit map.

Now the VBC expects at block 621 to obtain a digitized signature of the banker. If the banker. The banker can cancel the transaction if he is not satisfied, or conditions change. On the other hand, if the banker is satisfied, then, the banker signs a digitizer tablet and provides his verification of the captured image. At block 622, the digitized signature data is formed into a file, for example, sig.bmp, representing a bit map of the signature of the verification authority. The banker can still change their minds, but if block 623 is entered, the banker has clearly verified that the identity document is acceptable to him having captured its image and verified it. Block 623 represents the VBC transmitting the command CMD, generate, verification to the remote terminal. The remote terminal receives the command and operates to merge the doc.bmp and sig.bmp files together into a single file, for example, verif.bmp for storage, for example, in place of the doc.bmp file. At the moment the files are merged and the new verif.bmp file saved, the new file is time-stamped at the remote terminal with the time of day, day, month and year, the file was created. If the customer desires, the customer may have a printout of the verified document. Then, by convention, the .bmp is replaced with .prn and the merged verification file is sent to the printer for printing. Also, the merged verification file is preferably returned to VBC or central terminal for permanent storage rather than locally stored on a permanent basis. To this end, the merged verification file is preferably packetized and returned to the central terminal as a part of operations block 623.

This activity is repeated until the banker has verified enough identity documents to satisfy himself that the remote terminal user is indeed the person who appears before him. Referring briefly to FIGS. 9 and 10, there is shown a tabulation form whereby the banker indicates the type of identity documents verified and their point values as the process continues and, as per FIG. 9, in full view of the new bank customer. Then, the banker begins to assist the user to, for example, open an account, or whatever by printing out the form of FIG. 10 and assisting the user to complete other forms as necessary, loan application papers, signature cards or whatever.

Now, to further explain the principles of the present invention, an exemplary session will be described in the context of a customer's opening a new bank account during which identification of a user will be required. The user is attracted to a remote terminal of the present invention by an attract mode in which a bank commercial message is repeatedly played. The user understands that the present remote terminal can be actuated to perform a desired function he wants to perform, namely, to allow him to open a bank account. Moreover, the user appreciates from the attract mode that to actuate the terminal, he must actuate a particular key.

Once he actuates the connect key, the terminal may audibly suggest via voice synthesis or through display to be seated and await a connection to a personal banker via the on-screen-display of FIG. 7. Meanwhile, the remote terminal recognizes that it has been actuated and begins to initiate a call, at the same time, collecting and packetizing data at least identifying the terminal, for example, as PBC#2, perhaps, at telephone number (XXX) (YYY) (zzz-nnnn).

The central verification terminal or VBC then sends the command REQ "id" requesting the "id" of the PBC which, as described above comprises at least a unique PBC identifier and may further include the PBC's telephone number for return communication.

Meanwhile, a verification authority, such as a trained personal banker, enters a VBC identified as having been connected to the present user via the identified PBC and prepares to take the call. If the banker has not already logged on to the system, the banker does so by at least entering their personal password. The VBC may verify to the banker that the banker has logged on properly and properly associated their password with their name which is then used for generating data at the PBC for on-screen-display of the banker's name.

The personal banker may request the volume of the PBC microphone remotely via the command REQ "volume." The PBC then returns its present volume level. The personal banker may also check his self-image to assure that he is presentable before introducing himself to the potential client.

The banker, for example, Mr. James, when ready, causes a set parameters message to be sent from the VBC to the PBC, namely, SET, "video", "on." This message causes both audio and video to be actuated at the personal banking terminal (PBC) such that the user now sees the full screen image of the personal banker per FIG. 8 and the banker's name imprinted thereon as shown. When this command is sent, the PBC assumes that the data it receives from the VBC over the communications link thereafter comprises the banker's name for writing to the on-screen-display of FIG. 8. Moreover, the user will hear the personal banker speak through a speaker introduce himself and may use the microphone or utilize the telephone handset for privacy.

Thereafter, the personal banker and the bank customer may converse regarding the subject at hand, the customer's desire to open an account. At some point, the banker will request the user to produce some identification. The banker actuates the transmission of the command CMD, Videosource, document, to actuate the identity document reader camera. The resultant identity document image, if any, is digitized and transmitted by the communications link to the central terminal for display to the banker at the VBC.

Again, the personal banker and the bank customer may converse, this time, about the proper positioning of the identity document in the reader. Eventually, it will be assumed that the document is placed properly in the document reader to be read. Then, the CMD capture image message is sent from the VBC to the PBC and the image of the identity document captured, digitized and store, for example, as file doc.bmp. The banker verifies the identity of the individual user and the identity document by signing a signature image digitizer at the VBC. The digitized image, for example, may comprise approximately forty-five 1 kbyte packets of data which may be further encrypted and are transmitted to the PBC, where it is merged with the file doc.bmp into a new file verif.bmp and stored. Alternatively, in an alternate embodiment of the present invention, the digitized image file doc.bmp may be transmitted to the central terminal for merger with the sig.bmp file at the central terminal and time-of-day, date stamped there. In either event, the result is the same, namely, a stored verification record file combining an image of the identity document and the signature and identity of the verification authority along with a time-of-day and date stamp as to when the document was verified.

This process is repeated until the customer has produced enough identity documents to the banker to assure the banker that the customer is in deed the individual he claims to be. This process is recorded in the form shown on the whiteboard 903 of FIG. 9 to the user and completed by the banker as the process continues. For example, 100 points of acceptable identity documents must be presented and verified according to the form of FIGS. 9 and 10, the complete form showing this process being reproduced in FIG. 10. The banker and customer then move on to transact further bank business such as completing signature cards for opening a new account. The banker portrays a new form on a whiteboard as described above which the banker and customer may both view as the data fields of the form are completed by the banker entering data, such as the customer's name and so on.

Referring again to FIG. 9, there is shown the Banker appearing in the upper left hand corner of the PBC screen, the banker's name appears there below the banker's picture and the right portrait side of the screen is taken by an account opening form on whiteboard 903. Once the form is completed to the satisfaction of the banker and the user, the form may be printed out as a document file, doc.prn, for example, on bank letterhead. The customer may verify the accuracy of the data on the form, keep a copy and/or deposit a copy of the form in an appropriate receptacle at the remote terminal. Other forms may be similarly presented, completed and prepared for deposit or copies kept by the user with the personal banker's assistance. The customer can then leave the remote terminal when his business is completed and the terminal initialized for the next customer.

Also, in accordance with the present invention, the doc.bmp file or the sig.bmp file, whichever file is to be transmitted to a remote location may preferably be encrypted by any well known algorithm to prevent piracy or trickery prior to transmission. Wherever the files are merged and stored, the operations of decryption of a received file, merger and storage may occur in a secure processor of the appropriate terminal. Of course, when the verif.prn file is to be printed, it is output in the clear to a printer for printing. On the other hand, the verif.bmp file is preferably encrypted for transmission in whichever direction the data is being transmitted, to or from the remote terminal.

While the invention has been described in detail with reference to the appended drawings, the invention is limited in scope only by the claims. Moreover, any application or patent cited herein should be construed to be incorporated by reference as to any subject matter deemed essential to the present disclosure.

What we claim is:

1. A verification method for use in a verification system comprising a verification terminal operated by a verification authority, a remote terminal remote from said verification terminal, and a communication link coupling said verification terminal to said remote terminal, comprising the steps of:

generating a document data file from a document provided at the remote terminal;

transmitting said document data file from said remote terminal to said verification terminal via said communication link;

generating a verification data file at said verification terminal, said verification data file verifying an attribute of said document;

transmitting said verification data file from said verification terminal to said remote terminal via said communication link; and merging said document data file and said verification data file to generate a verification record.

2. The method according to claim 1, wherein said step of merging is performed at said remote terminal.

3. The method according to claim 1, further including the step of time stamping said verification record.

4. The method according to claim 1, further comprising the step of printing said verification record.

5. The method according to claim 1, wherein said document comprises an identification of a user of said remote terminal.

6. The method according to claim 1, wherein said step of generating a document data file comprises the step of scanning said document.

7. The method according to claim 1, wherein said step of generating a document data file comprises the step of capturing an image of said document.

8. The method according to claim 1, wherein said verification data file comprises a verification authority identification.

9. The method according to claim 8, wherein said document includes a photo identification of a user of said remote terminal, said remote terminal includes a camera for capturing an image of the user of said remote terminal and a processor for processing said image to generate user image data, said method further including the steps of:

transmitting said user image data from said remote terminal to said verification terminal via said communication link;

displaying at said verification terminal an image generated from said document data file and an image generated from said user image data; and verifying the identity of the user by comparison of said displayed images.

10. The method according to claim 9, wherein said step of generating a verification data file comprises the step of digitizing a signature of a verification terminal user, said digitized signature comprising said verification authority identification.

11. In a verification system including a verification terminal operated by a verification authority, a remote terminal remote from said verification terminal, and a communication link coupling said verification terminal to said remote terminal, a method of operating said remote terminal comprising the steps of:

generating a document data file from a document provided by a user;

transmitting said document data file from said remote terminal to said verification terminal via said communication link;

receiving a verification data file from said verification terminal, said verification data file verifying an attribute of said document; and merging said document data file and said verification data file to generate a verification record.

12. The method according to claim 11, wherein said step of generating said document data file comprises the step of scanning said document.

13. The method according to claim 11, wherein said step of generating said document data file comprises the step of capturing an image of said document.

14. The method according to claim 11, further including the step of time stamping said verification record.

15. The method according to claim 11, further comprising the step of printing said verification record.

16. The method according to claim 11, wherein said document comprises an identification of a user of said remote terminal.

17. The method according to claim 11, wherein said document includes a photo identification of a user of said remote terminal, said remote terminal includes a camera for capturing an image of the user of said remote terminal and a processor for processing said image to generate user image data, said method further including the step of:

transmitting said user image data to said verification terminal via said communication link.

18. The method according to claim 11, wherein said verification data file comprises a verification authority identification.

19. The method according to claim 18, wherein said verification data file comprises a digitized signature of a verification terminal user, said digitized signature comprising said verification authority identification.

20. In a verification system including a verification terminal operated by a verification authority, a remote terminal remote from said verification terminal, and a communication link coupling said verification terminal to said remote terminal, a method of operating said verification terminal comprising the steps of:

receiving from said remote terminal a document data file, said document data file representing an image of a document;

generating a verification data file at said verification terminal, said verification data file verifying an attribute of said document;

transmitting said verification data file from said verification terminal to said remote terminal via said communication link; and merging said document data file and said verification data file to generate a verification record.

21. The method according to claim 20, further including the step of time stamping said verification record.

22. The method according to claim 20, wherein said verification data file comprises a verification authority identification.

23. The method according to claim 22, wherein said document data file comprises pixel data representing a photo identification of a user of said remote terminal, said method further including the steps of:

receiving user image data representing an image of the user of said remote terminal;

displaying an image generated from said document data file and an image generated from said user image data at said verification terminal; and verifying the identity of the user of said remote terminal by comparing said displayed images.

24. The method according to claim 23, wherein said step of generating a verification data file comprises the step of digitizing a signature of a verification terminal user, said digitized signature comprising said verification authority identification.

25. A verification system comprising a verification terminal operated by a verification authority, a remote terminal remote from said verification terminal, and a communication link coupling said verification terminal to said remote terminal, wherein said remote terminal comprises:

an imager for imaging a document to generate a document data file; and a transmitter for transmitting said document data file to said verification terminal via said communication link;

said verification terminal comprises:

a receiver for receiving said document data file;

means for generating a verification data file at said verification terminal, said verification data file verifying an attribute of said document; and a transmitter for transmitting said verification data file to said remote terminal via said communication link, said remote terminal further comprising:

a receiver for receiving said verification data file; and means for merging said document data file and said verification data file to generate a verification record.

26. The verification system according to claim 25, wherein said remote terminal further comprises a printer for printing said verification record.

27. The verification system according to claim 25, wherein said verification data file includes a verification authority identification.

28. The verification system according to claim 27, wherein said means for generating a verification data file comprises a digitizer for digitizing a signature of a user of said verification terminal, said digitized signature comprising said verification authority identification.

29. The verification system according to claim 25, wherein said imager comprises a scanner for scanning said document.

30. A remote terminal for use in a verification system comprising:
   an imager for imaging a document to generate a document data file;
   a transmitter for transmitting said document data file to a verification terminal via a communication link;
   a receiver for receiving a verification data file from said verification terminal, said verification data file verifying an attribute of said document; and
   means for merging said document data file and said verification data file to generate a verification record.

31. The remote terminal according to claim 30, further comprising a printer for printing said verification record.

32. The remote terminal according to claim 30, wherein said document comprises an identification of a user of said remote terminal.

33. The remote terminal according to claim 30, wherein said verification data file includes a verification authority identification.

34. The remote terminal according to claim 33, wherein said verification data file comprises a digitized signature of a user of said verification terminal, said digitized signature comprising said verification authority identification.

35. The remote terminal according to claim 30, wherein said imager comprises a scanner for scanning said document.

36. A verification terminal for use in a verification system, comprising:
   a receiver for receiving a document data file from a remote terminal over a communication link, said document data file representing an image of a document;
   means for generating a verification data file at said verification terminal, said verification data file verifying an attribute of said document and including a verification authority identification; and
   a transmitter for transmitting said verification data file to said remote terminal via said communication link.

37. The verification terminal of claim 35, wherein said means for generating a verification data file comprises a digitizer for digitizing a signature of a user of said verification terminal.

\* \* \* \* \*